United States Patent [19]

Jorgensen et al.

[11] Patent Number: 4,923,137
[45] Date of Patent: May 8, 1990

[54] TAPE REEL HUB

[75] Inventors: Charles A. Jorgensen, Hudson, Wis.; Robert J. Kline, Stillwater, Minn.

[73] Assignee: Minnesota Mining and Manufacturing Company, St. Paul, Minn.

[21] Appl. No.: 287,001

[22] Filed: Dec. 20, 1988

[51] Int. Cl.⁵ .............................................. B65H 75/10
[52] U.S. Cl. ................................................ 242/68.5
[58] Field of Search ................. 242/68.5, 68.6, 71.8, 242/72 R, 110, 118.11, 118.2

[56] References Cited

U.S. PATENT DOCUMENTS

| | | | |
|---|---|---|---|
| 2,350,369 | 6/1944 | Sampair et al. | 242/68.5 |
| 3,132,822 | 5/1964 | Arthur | 242/68.5 |
| 3,550,872 | 12/1970 | Porterfield | 242/71.8 X |
| 3,627,221 | 12/1971 | Nichols et al. | 242/68.6 |
| 3,632,053 | 1/1972 | Edwards et al. | 242/71.8 |
| 3,973,740 | 8/1976 | Schankler | 242/68.5 |
| 4,184,650 | 1/1980 | Nelson et al. | 242/71.8 |
| 4,256,273 | 3/1981 | Burleigh | 242/68.5 X |
| 4,541,587 | 9/1985 | Stumpfi et al. | 242/68.5 X |

FOREIGN PATENT DOCUMENTS 1593250 7/1981 United Kingdom ............... 242/68.5

Primary Examiner—John M. Jillions
Attorney, Agent, or Firm—Donald M. Sell; Walter N. Kirn; David W. Anderson

[57] ABSTRACT

A tape reel hub includes an inner ring, an outer ring and angled ribs connecting the two rings. The ribs deflect upon compression of the outer ring to prevent the transmission of this compression to the inner ring.

5 Claims, 1 Drawing Sheet

4,923,137

TAPE REEL HUB

TECHNICAL FIELD OF THE INVENTION

The present invention relates to hubs upon which is convolutely wound a tape to produce a tape reel.

BACKGROUND OF THE INVENTION

As tape is wound upon a hub to produce a tape reel, the tape exerts a uniform compressive force around the circumference of the hub. This compressive force causes the hub to deform inwardly and produces a reduction of the inside diameter of the hub by as much as 0.25 mm. In a production setting, this reduction of the inside diameter of the hub causes the hub to bind on its driving spindle or clutch, thus making the hub difficult to remove and replace.

U.S. Pat. No. 3,632,053 has addressed this problem by providing resilient beam members between an outer ring and an inner ring, both comprising a hub, which resilient beam members are meant to prevent compression forces on the outer ring from being transmitted to the inner ring and thus reducing its inner diameter. While the teachings of this patent have been effective to somewhat reduce the reduction of the inner diameter of the hub, it has not been totally successful and some reduction of the inner diameter still occurs.

SUMMARY OF THE INVENTION

The present invention eliminates reduction of the inner diameter of a tape reel hub or reduces such reduction to an acceptable level, by providing a tape reel hub which includes an inner ring, an outer ring having an outer circumferential surface comprising a tape winding surface and ribs connecting the inner and outer rings and angled with respect to a radius of the hub so that compression of the outer ring results in angular displacement of the ribs with respect to the inner and outer rings and rotation of the inner ring rather than a compression of the inner ring corresponding to the compression of the outer ring.

The ribs are preferably angled between 45° and 75° with respect to a radius of the hub and, also preferably, include a weakened portion adjacent the inner and outer rings to facilitate angular displacement of the ribs relative to the inner and outer rings.

DESCRIPTION OF THE DRAWINGS

The present invention will be more thoroughly described with respect to the accompanying drawings, wherein like numbers refer to like parts in the several views, and wherein.

DESCRIPTION OF THE PREFERRED EMBODIMENT

Figure 1:
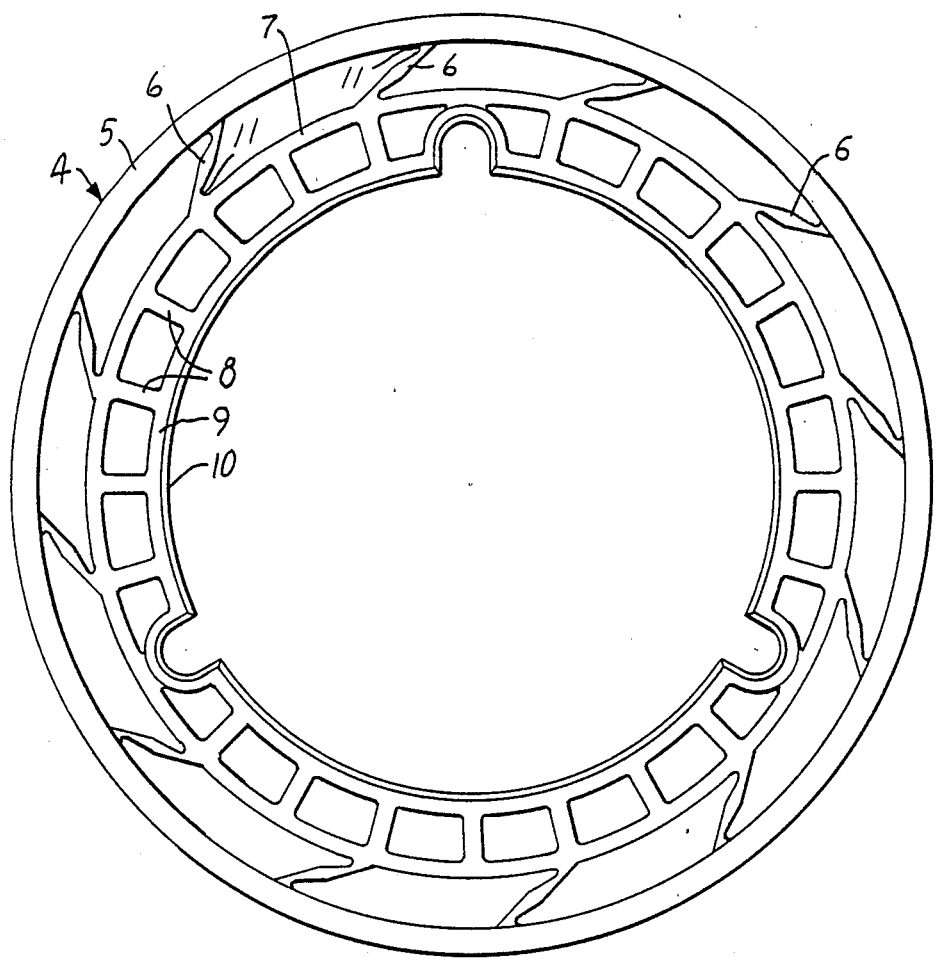
FIG. 1 is an elevational view of a tape reel hub according to the present invention.

A tape reel hub, generally indicated as 4 in FIG. 1, includes an outer ring 5, an inner ring 9 and an intermediate ring 7 attached to the inner ring 9 by columns 8.

The columns 8 are provided between the intermediate ring 7 and the inner ring 9 to reduce the amount of material necessary to manufacture the tape reel hub 4, but it should be recognized that the entire area between the inner ring 9 and the intermediate ring 7 could be solid.

Figure 2:
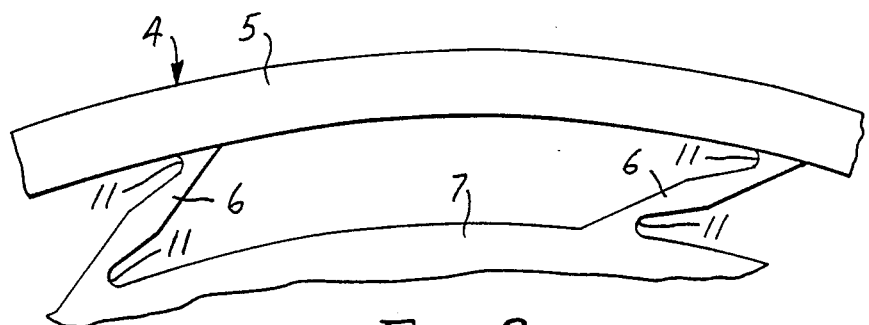
FIG. 2 is an enlarged, elevational view of a portion of the tape reel hub of FIG. 1.

As is shown in both FIG. 1 and FIG. 2, the intermediate ring 7 is connected to the outer ring 5 by a series of ribs 6.

In use, the inner diameter 10 of the tape reel hub 4 is placed over a clutch (not shown) which is driven by a shaft. The tape reel hub 4 is rotated and tape of any sort is wound under tension onto the tape reel hub 4. Because the tape is wound under tension, a compressive force is generated around the entire outer circumference of the outer ring 5.

Prior to this invention, the inner ring 9 and the outer ring 5 were rigidly connected so that the compressive forces acting on the outer ring 5 were transferred to the inner ring 9 and resulted in a reduction of the inner diameter 10 of the tape reel hub 4. This reduction in diameter of the inner diameter 10 of the tape reel hub 4 caused the tape reel hub 4 to bind on its supporting clutch and made removal of the tape reel hub 4 extremely difficult.

According to the present invention, this compression of the inner ring 9 and the consequent reduction of the inner diameter 10 of the inner ring 9 is alleviated by the provision of the ribs 6 which connect the inner ring 9 to the outer ring 5. The ribs 6 actually connect the intermediate ring 7 to the outer ring 5, but for purposes of this invention and because the intermediate 7 is rigidly attached to the inner ring 9, it can be considered that the combination of the intermediate ring 7, the columns 8 and the inner ring 9 constitute a single unit which will be collectively referred to in this specification and the attached claims as the "inner ring".

The ribs 6 are provided to prevent the compressive forces generated on the outer ring 5 from being transmitted to the inner ring 9 and resulting in a reduction of the inner diameter 10 of the inner ring 9. When the outer ring 5 is subjected to a compressive force which reduces the diameter of the outer ring 5, the ribs 6 are angularly deflected such that the angle between the ribs 6 and a radius of the tape reel hub 4 is increased. This angular deflection of the ribs 6 results in a counterclockwise rotation, as viewed in FIG. 1, of the inner ring 9 rather than a compression of the inner ring 9 corresponding to the compression of the outer ring 5. It will be recognized that compressive forces on the inner ring 9 are not totally eliminated but the action of the ribs 6 reduces the compression of the inner ring 9 to a magnitude which can be tolerated in the production setting for which the tape reel hub 4 is intended.

As best seen in FIG. 2, the angular displacement of the ribs 6 is facilitated by weakening the ribs at the points 11 where the ribs 6 attach to the rings 5 and 7. The ribs 6 include sufficient material at the mid-point of the ribs 6 to resist buckling or bending of the ribs 6, but include a reduced thickness 11 adjacent the rings 5 and 7 to facilitate the angular displacement of the ribs 6 relative to the rings 5 and 7. The result is ribs 6 which are essentially diamond-shaped in cross-section with a maximum thickness at the mid point of the rib 6 and a narrowed cross-section adjacent the rings 5 and 7.

The ribs 6 are preferably angled at 60° with respect to a radius of the tape reel hub 4, as shown. An angle of the ribs 6 with respect to a radius of the tape reel hub 4 of between 45° and 75° has been found to be effective. These limitations are not strict, but at angles of less than 45°, too great a magnitude of the compressive forces exerted on the outer ring 5 are transmitted to the inner ring 9, and 75° with respect to a radius of the tape reel hub 4 is approximately the upper limit because of problems with molding the hub 4 if the angle is increased beyond this value.

We claim:

1. A tape reel hub comprising:
   an inner ring;
   an outer ring having an outer surface defining a tape-winding surface;
   ribs connecting said inner and said outer rings and angled with respect to a radius of said hub so that compression of said outer ring by said tape results in angular displacement of said ribs relative to said inner and said outer rings and rotation of said inner ring rather than a compression of said inner ring corresponding to said compression of said outer ring; and
   a weakened area adjacent said inner and said outer rings to facilitate said angular displacement of said ribs.

2. A tape reel hub according to claim 1 wherein said ribs are angled between 45° and 75° with respect to a radius of said hub.

3. A tape reel hub according to claim 2 wherein said ribs are angled about 60° with respect to a radius of said hub.

4. A tape reel hub according to claim 1 wherein said ribs are weakened by a decrease in the thickness of said ribs adjacent said inner and said outer rings so that said ribs include sufficient material approximately midway between said inner and said outer rings to resist buckling or bending of said ribs but a reduced thickness adjacent said inner and said outer rings to facilitate said angular displacement of said ribs relative to said inner and said outer rings.

5. A tape reel hub according to claim 4 wherein said ribs are each diamond-shaped in cross-section.

* * * * *